(12) United States Patent
Li et al.

(10) Patent No.: US 10,186,987 B2
(45) Date of Patent: Jan. 22, 2019

(54) ELECTROMAGNETIC DRIVE CONTROL SYSTEM

(71) Applicant: Harbin Institute Of Technology, Harbin (CN)

(72) Inventors: Liyi Li, Harbin (CN); Donghua Pan, Harbin (CN); Qingbo Guo, Harbin (CN); Junjie Hong, Harbin (CN)

(73) Assignee: Harbin Institute of Technology, Harbin (CN)

( * ) Notice: Subject to any disclaimer, the term of this patent is extended or adjusted under 35 U.S.C. 154(b) by 334 days.

(21) Appl. No.: 15/023,402

(22) PCT Filed: Sep. 9, 2014

(86) PCT No.: PCT/CN2014/086140
§ 371 (c)(1),
(2) Date: Mar. 20, 2016

(87) PCT Pub. No.: WO2015/043374
PCT Pub. Date: Apr. 2, 2015

(65) Prior Publication Data
US 2016/0211770 A1 Jul. 21, 2016

(30) Foreign Application Priority Data

Sep. 30, 2013 (CN) .......................... 2013 1 0460561

(51) Int. Cl.
*H02J 7/34* (2006.01)
*H02J 1/10* (2006.01)
(Continued)

(52) U.S. Cl.
CPC ........... *H02M 7/5387* (2013.01); *H02M 1/14* (2013.01); *H02M 2001/0054* (2013.01);
(Continued)

(58) Field of Classification Search
CPC .................. H02M 1/14; H02M 7/5387; H02M 2001/0054; H02M 2003/1555; H02P 7/04; Y02B 70/1491
(Continued)

(56) References Cited

U.S. PATENT DOCUMENTS

2014/0001858 A1* 1/2014 Kwasinski ........ H02M 3/33569
307/52

FOREIGN PATENT DOCUMENTS

| CN | 1949642 A | 4/2007 |
| CN | 103171452 A | 6/2013 |
| CN | 103488103 A | 1/2014 |

OTHER PUBLICATIONS

International Search Report and Written Opinion in related PCT Application No. PCT/CN2014/086140, dated Nov. 28, 2014.

* cited by examiner

*Primary Examiner* — Rexford Barnie
*Assistant Examiner* — Toan Vu
(74) *Attorney, Agent, or Firm* — Troutman Sanders LLP; Ryan A. Schneider; Christopher C. Close, Jr.

(57) ABSTRACT

An electromagnetic drive control system comprising an H-shaped full bridge driving circuit connected to a controlled electromagnetic unit, including a first field effect transistor (FET) and a fourth FET connected in series constituting the left arm of the H-shaped full-bridge driving circuit, and a second FET and a third FET connected in series constituting the right arm of the H-shaped full-bridge driving circuit; PWM control unit is used to provide control signal to the FETs of the left and right bridge arms; it is characterized in that: the left arm comprises a first DC voltage source connected in series to the drain of the first FET, and the right arm includes a second DC voltage source connected in series to the drain of the second FET so as to
(Continued)

form a dual power circuit; in this configuration, the first DC voltage source and the second DC voltage source are configured appropriately to greatly weaken the output current ripple of the electromagnetic drive control system and allow the system to realize super-high precision control of the electromagnetic drive control system under lower switching frequency, as a result, it can improve the stability of the system, reduce the loss of the system, and significantly decrease the cost of the drive controller.

4 Claims, 4 Drawing Sheets

(51) Int. Cl.
      *H02J 3/38*         (2006.01)
      *H02M 7/5387*    (2007.01)
      *H02M 1/14*       (2006.01)
      *H02M 1/00*       (2006.01)
      *H02M 3/155*     (2006.01)
      *H02P 7/03*       (2016.01)
(52) U.S. Cl.
      CPC ....... *H02M 2003/1555* (2013.01); *H02P 7/04* (2016.02); *Y02B 70/1491* (2013.01)
(58) Field of Classification Search
      USPC .......................................................... 307/130
      See application file for complete search history.

ELECTROMAGNETIC DRIVE CONTROL SYSTEM

CROSS-REFERENCE TO RELATED APPLICATIONS

This application is a U.S. National Stage of International Application No. PCT/CN2014/086140, filed 9 Sep. 2014, which claims the benefit of CN201310460561.5, filed 30 Sep. 2013, each herein fully incorporated by reference.

TECHNICAL FIELD

The present invention relates to the electromagnetic drive control field, especially a control system which can weaken the current ripple in the electromagnetic drive field.

BACKGROUND TECHNOLOGY

In the present electromagnetic drive field, the main technical means is the application of the electromagnetic induction law realized by Faraday to covert current to force or torque through the medium of magnetic field. Therefore, the output characteristics of the drive current have a strong influence on the operating characteristics of the electromagnetic drive system. Thus in ultra-high precision control field, such as voice coil motor ultra-high precision servo drive system, magnetic bearing drive system and magnetic rail suspension drive system, researchers begin to focus on the rapidity, stability and high frequency handling features of the output current of the electromagnetic drive system.

Currently in ultra-high precision electromagnetic drive field, the design for electromagnetic drive controller is mainly divided into linear power amplifier scheme and PWM power converter scheme. When the linear power amplifier scheme is adopted for the ultra-high precision electromagnetic drive control system, it has the characters as the rapid current response, the eliminated current ripple generated by switching device and the increasing stability of output current. However, if the linear power amplifier scheme is adopted, firstly, there also is current response overshoot and nonlinear region in current jump. Secondly, high performance control is more difficult due to the restricted controller design. Further, if the linear power amplifier scheme is adopted for the ultra-high precision electromagnetic drive control system, the heat generated by the system device results in large energy loss. One important development direction of the ultra-high precision electromagnetic drive control system is high overload and high acceleration, which undoubtedly impose more requirements on the power level of the components, making the linear power amplifier scheme increasingly uncapable of meeting the power requirements of the ultra-high precision electromagnetic drive control system.

If PWM power converter scheme is adopted for the ultra-high precision electromagnetic drive control system, since the control signal of the electromagnetic drive system is controlled by digital processor, the controller design of the electromagnetic drive system is more flexible, and the driving performance of the system may be controlled by more complicated control methods, at the same time, the system is featured by rapid response and high efficiency. However, there also exist certain weaknesses for the PWM power converter scheme. Firstly, since that the chopped of switching devices will inevitably generate current ripple in the system (the current fluctuations generated by the chopped of switching devices in the system are collectively referred to as current fluctuations hereinafter), the thrust (or torque) fluctuation caused by current fluctuation will greatly impact the controlling performance of the ultra-high precision electromagnetic drive control system. Secondly, the dead time set to prevent the direction connection between the upper and lower arms of the switching circuit will also lead to instability of the drive system.

Currently, in order to reduce the current fluctuation generated by PWM power converter scheme in the electromagnetic drive control system, a drive mode of high switching frequency is generally adopted. For example, the switching frequency of the switching device is raised to 200 kHz by the designer to reduce current fluctuation, and the system current fluctuation is decreased to 5% of the original fluctuation when compared with the 10 kHz switching frequency adopted in conventional electromagnetic drive control system. However, at the same time, with the switching frequency of the switching device increasing by 20 times, the switching loss of the switching device also increases by 20 times, and it is also more demanding as to the performance of switching devices, which increases the cost of the drive system. What's more, increasing the switching frequency will also increase the difficulty in the controlling of the control system and designing of the driving circuit for the drive system, substantially decreasing system stability.

As technology background, an existing electromagnetic drive control system under PWM power converter scheme is described for contrastive analysis. Refer to FIG. 1, the electromagnetic drive control system comprises an H-shaped full bridge driving circuit, including a first FET and a fourth FET connected in series constituting the left arm of the H-shaped full-bridge driving circuit, and a second FET and a third FET connected in series constituting the right arm of the H-shaped full-bridge driving circuit; a first parasitic diode is connected between the drain and the source of the first FET, a second parasitic diode is connected between the drain and the source of the second FET, a third parasitic diode is connected between the drain and the source of the third FET, a fourth parasitic diode is connected between the drain and the source of the fourth FET. It is important that the H-shaped full bridge driving circuit consists of only one DC voltage source, both sides of which are connected in parallel to the left and right arms of the H-shaped full bridge driving circuit.

SUMMARY OF THE INVENTION

In order to overcome the influence of current fluctuation on the servo performance of the system in the PWM power converter scheme adopted in existing ultra-high precision electromagnetic drive control system, an object of the present invention is to provide an electromagnetic drive system, which can not only greatly weaken the current fluctuation of the electromagnetic drive control system, but also allow the system to realize ultra-high precision control of the electromagnetic drive control system under lower switching frequency, improve the stability of the system, reduce the loss of the system, and significantly decrease the cost of the drive controller.

Another object of the present invention is to provide a control method for the electromagnetic drive control system.

To achieve the above objects, the electromagnetic drive control system comprises the H-shaped full bridge driving circuit, including a first FET and a fourth FET connected in series constituting the left arm of the H-shaped full-bridge driving circuit, and a second FET and a third FET connected in series constituting the right arm of the H-shaped full-bridge driving circuit; a first parasitic diode is connected between the drain and the source of the first FET, a second parasitic diode is connected between the drain and the source of the second FET, a third parasitic diode is connected between the drain and the source of the third FET, a fourth parasitic diode is connected between the drain and the source of the fourth FET; it is characterized that the left arm also comprises a first DC voltage source connected in series to the drain of the first FET, and the right arm includes a second DC voltage source connected in series to the drain of the second FET so as to form a dual power circuit; wherein the first DC voltage source and the second DC voltage source satisfy the followings:

$$\begin{cases} U_{dc1} = \dfrac{(1-D) \cdot B_f \cdot \Delta I \cdot R}{A} + R \cdot \bar{I} \\ U_{dc2} = \dfrac{D \cdot B_f \cdot \Delta I \cdot R}{A} - R \cdot \bar{I} \end{cases}$$

Wherein, $U_{dc1}$ denotes the voltage of the controlled voltage source on the left bridge arm in the dual power circuit;

$U_{dc2}$ denotes the voltage of the controlled voltage source on the right bridge arm in the dual power circuit;

R denotes the winding resistance of the controlled electromagnetic unit;

D denotes the duty cycle of the switching device in the dual power driving circuit;

$\bar{I}$ denotes the average current required in a switching period of the dual power driving circuit;

$B_f$ denotes the margin coefficient tolerating average output current and current fluctuation of the system of the dual power driving circuit, $0 < B_f \le 1$;

A denotes the current fluctuation coefficient of the electromagnetic drive control system, $$A = \left| \dfrac{e^{-\frac{R}{L}(1-D)T} + e^{-\frac{R}{L}DT} - e^{-\frac{R}{L}T} - 1}{1 - e^{-\frac{R}{L}T}} \right|$$

Wherein, L is the winding inductance of the electromagnetic drive control system.

The beneficial effect of the present invention is that the electromagnetic drive system can not only greatly weaken the output current fluctuation of the electromagnetic drive control system, but also allow the system to realize ultra-high precision control of the electromagnetic drive control system under lower switching frequency, improve the stability of the system, reduce the loss of the system, and significantly decrease the cost of the drive controller.

DESCRIPTION OF THE PREFERRED EMBODIMENT

This invention will be explained with reference to the drawings.

The electromagnetic drive control system of the present invention adopts the improved dual power structure to realize electromagnetic drive control, the main purpose is to reduce the output current fluctuation of the electromagnetic drive control system as much as possible while meeting the average output current requirements of the electromagnetic drive control system by adjusting the voltage of two controlled voltage sources in the driving circuit, thus. Specifically, the voltage difference of the two voltage sources and the duty cycle of the dual power driving circuit are adjusted to obtain required output current fluctuation; and the voltage sum of the two voltage sources and the duty cycle of the dual power driving circuit are adjusted to obtain required average output current. Furthermore, the output current of the electromagnetic drive control system is precisely controlled through only a winding and a dual power driving circuit, namely, without changing the switching frequency of the driving circuit.

Figure 2A:
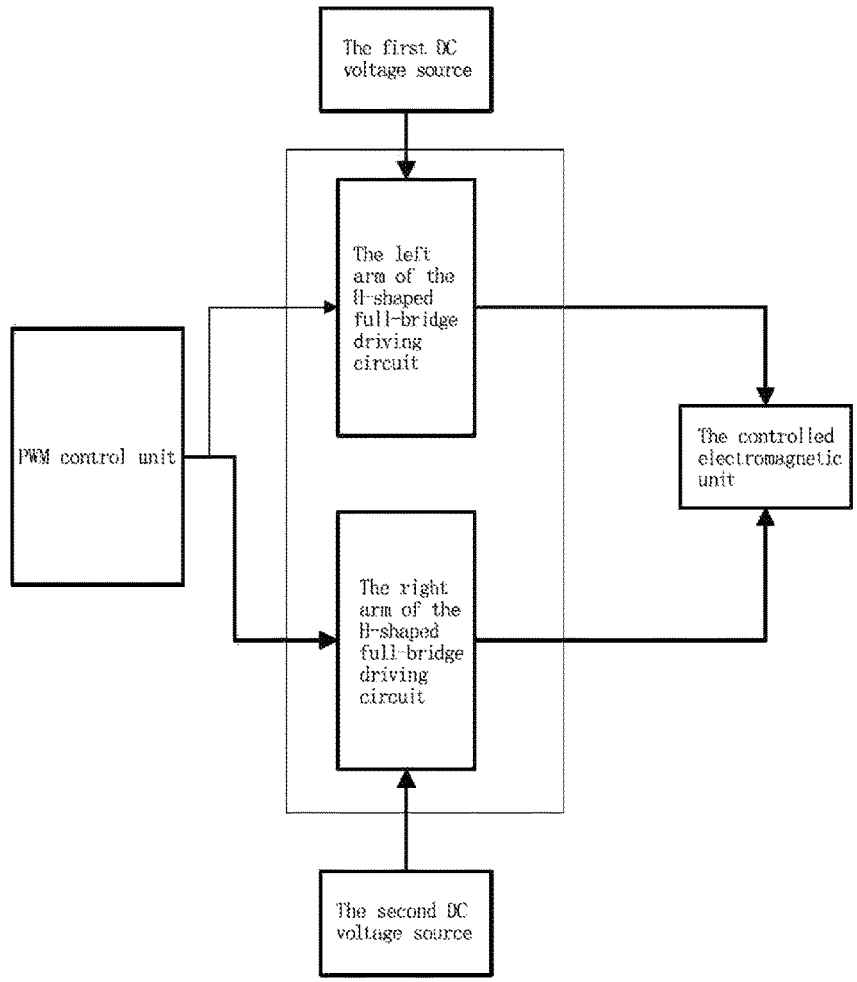
FIG. 2 is a circuit diagram of an electromagnetic drive control system according to the present invention.
Figure 2B:
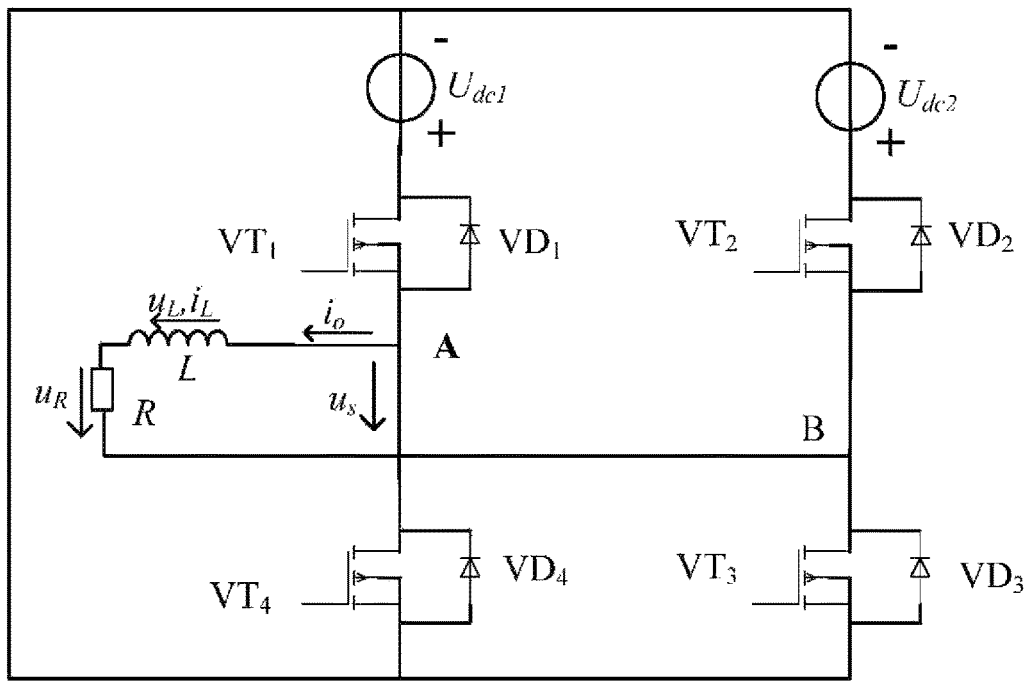

It is described in detail below:

FIG. 2 shows the circuit diagram of an electromagnetic drive control system according to the present invention. The electromagnetic drive control system comprises an H-shaped full bridge driving circuit, with the first DC voltage source, the first FET VT1 and the fourth FET VT4 connected in series constituting the left arm of the H-shaped full-bridge driving circuit, and the second DC voltage source, the second FET VT2 and the third FET VT3 connected in series constituting the right arm of the H-shaped full-bridge driving circuit, thus making the H-shaped full bridge driving circuit a dual power full bridge driving circuit. What's more, a first parasitic diode VD1 is connected between the drain and the source of the first FET VT1, a second parasitic diode VD2 is connected between the drain and the source of the second FET VT2, a third parasitic diode VD3 is connected between the drain and the source of the third FET VT3, a fourth parasitic diode VD4 is connected between the drain and the source of the fourth FET VT4.

Wherein, the voltages of two controlled power in the dual power driving circuit may be calculated by the following formula:

$$\begin{cases} U_{dc1} = \dfrac{(1-D) \cdot B_f \cdot \Delta I \cdot R}{A} + R \cdot \bar{I} \\ U_{dc2} = \dfrac{D \cdot B_f \cdot \Delta I \cdot R}{A} - R \cdot \bar{I} \end{cases} \quad (1.1)$$

Wherein $U_{dc1}$ denotes the voltage of the controlled voltage source on the left bridge arm in the dual power circuit;

$U_{dc2}$ denotes the voltage of the controlled voltage source on the right bridge arm in the dual power circuit;

R denotes the winding resistance of the controlled electromagnetic unit;

D denotes the duty cycle of the switching device in the dual power driving circuit;

I denotes the average current required in a switching period of the dual power driving circuit;

$B_f$ denotes the margin coefficient tolerating average output current and current fluctuation of the system of the dual power driving circuit, $0<Bf\leq1$;

A denotes the current fluctuation coefficient of the electromagnetic drive control system, $$A = \left| \frac{e^{-\frac{R}{L}(1-D)T} + e^{-\frac{R}{L}DT} - e^{-\frac{R}{L}T} - 1}{1 - e^{-\frac{R}{L}T}} \right|$$

Wherein, L is the winding inductance of the electromagnetic drive control system.

Furthermore, without changing the switching frequency of the driving circuit, the voltages of two controlled voltage sources in the dual power driving circuit are adjusted, achieving the command of the average output current of the electromagnetic drive control system while meeting the system current fluctuation requirements.

The simulation experiments are used to verify the correctness and rationality, i.e. the beneficial effects, of the theoretical analysis.

Figure 1:
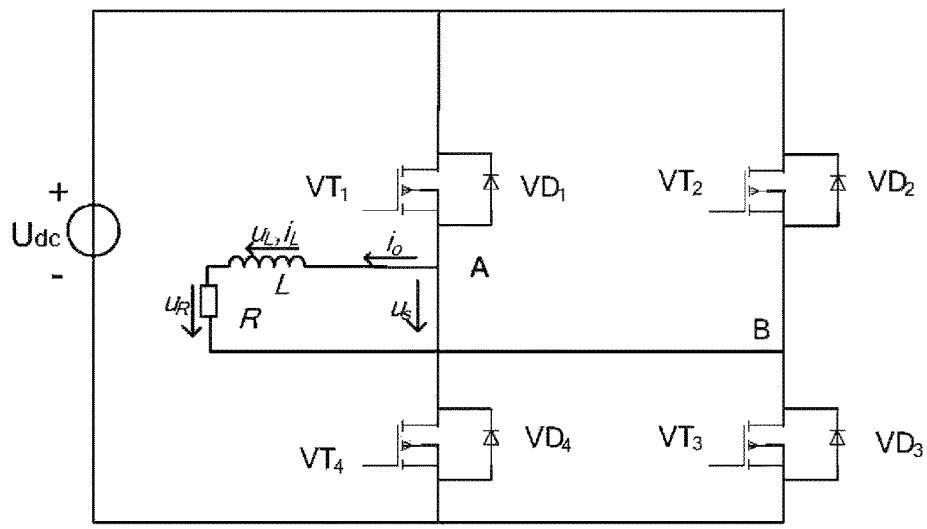
FIG. 1 is a circuit diagram of a conventional electromagnetic drive control system.

The circuit structure of the conventional single power H-shaped full bridge driving circuit is shown in FIG. 1.

Figure 3:
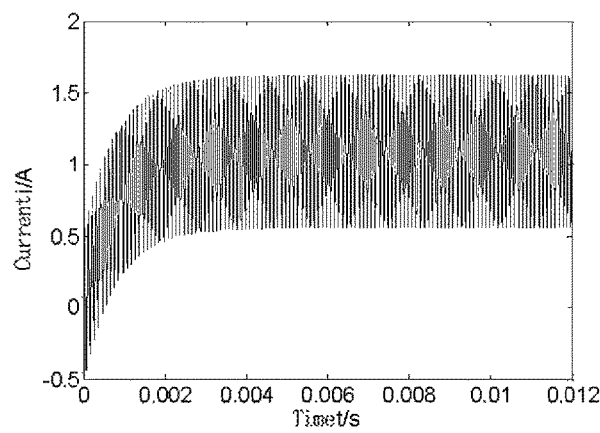
FIG. 3 is a simulation waveform of the system output current of a conventional single power driving circuit under a frequency of 10 kHz.

The simulation waveform of the output current of an conventional electromagnetic drive system under a switching frequency of 10 kHz is shown in FIG. 3.

Figure 4:
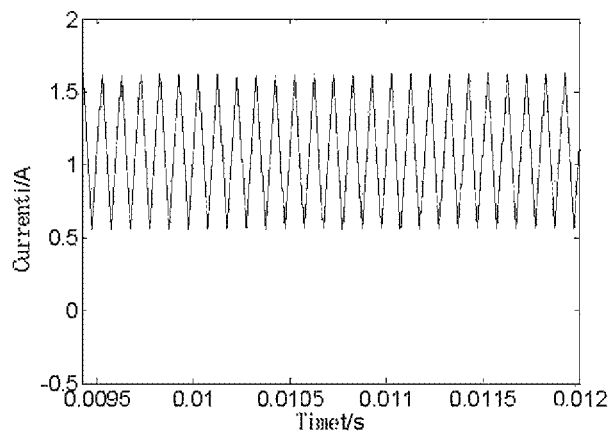
FIG. 4 is a partial enlarged view of the system output current under a switching frequency of 10 kHz.

From the partial enlarged view of FIG. 4, under a switching frequency of 10 kHz, the steady fluctuating range of system output current is 1.6211 A~0.5611 A, the average output current in a switching period is 1.0911 A, and the fluctuation of output current is 1.06 A.

Figure 5:
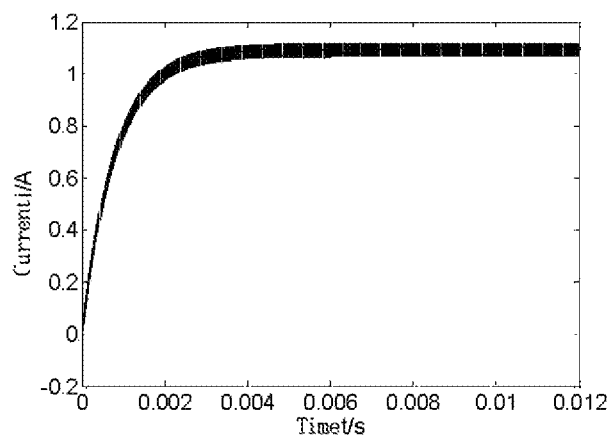
FIG. 5 is a simulation waveform of the system output current of a conventional single power driving circuit under a frequency of 200 kHz.

For conventional single power driving circuit, the fluctuation of output current of the electromagnetic drive control system is usually reduced by raising the switching frequency. For the conventional electromagnetic drive control system, while keeping the system DC bus voltage constant, the simulation waveform of the system output current is shown in FIG. 5 when the system switching frequency is raised to 200 kHz.

Figure 6:
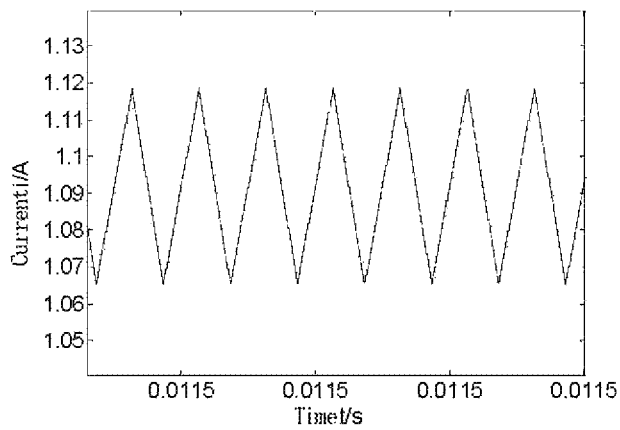
FIG. 6 is a partial enlarged view of the system output current under a switching frequency of 200 kHz.

From the partial enlarged view of FIG. 6, the fluctuating range of system steady output current is 1.1183 A~1.0653 A, the average output current in a switching period is 1.0918 A, and the fluctuation of output current is 0.053 A, decreasing to 5% of the fluctuation of the system output current under a switching frequency of 10 kHz.

Figure 7:
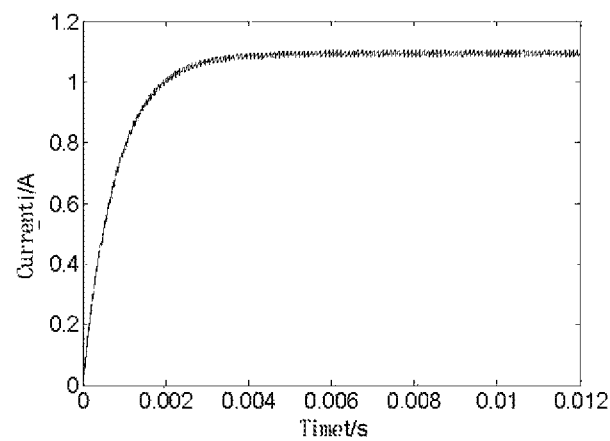
FIG. 7 is a simulation waveform of the output current of a dual power driving circuit under a frequency of 10 kHz.

When the electromagnetic drive control system adopts the dual power drive control circuit structure of the present invention, keeping the DC bus voltage constant and the switching frequency at 10 kHz, the simulation waveform of the output current is shown in FIG. 7 for the same electromagnetic drive system.

Figure 8:
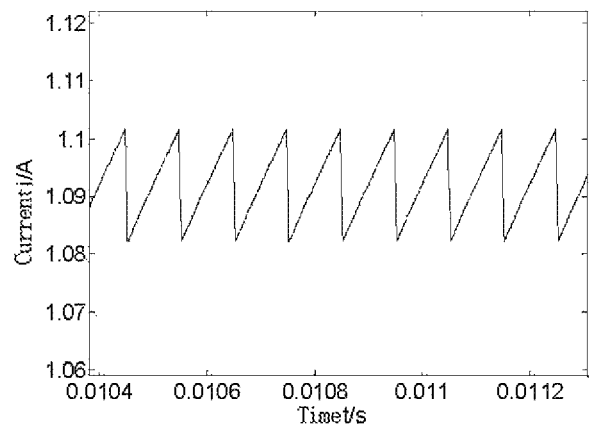
FIG. 8 is a partial enlarged view of the output current of a dual power driving circuit under a frequency of 10 kHz.

From the partial enlarged view of FIG. 8, the fluctuating range of steady system output current is 1.1015 A~1.0822 A, the average output current in a switching period is 1.0919 A, and the fluctuation of output current is 0.0193, equaling to 1.82% of the current fluctuation of the conventional single power driving circuit under a switching frequency of 10 kHz. The simulation experiments are used to verify the correctness and rationality of the theoretical analysis. The dual power scheme described in the present invention can weaken the system output current fluctuation while ensuring the average system output current, thus meeting the average system output current and current fluctuation requirements of electromagnetic drive control system in high precision control field.

The above are only preferred embodiments of the present invention and are not intended to limit the scope of the present invention, that is to say, any equivalent change or modification based on the patent application of the present invention shall be covered by the technical scope of the invention.

The invention claimed is:

1. An electromagnetic drive system comprising:
   four field effect transistors (FETs);
   a controlled electromagnetic unit;
   a PWM control unit;
   a first and a second controlled DC voltage source; and
   a switching device;
   wherein the four FETS form an H-shaped full bridge driving circuit including a first FET and a fourth FET connected in series forming a left bridge arm, and a second FET and a third FET connected in series forming a right arm;
   wherein the H-shaped full bridge driving circuit is connected to the controlled electromagnetic unit;
   wherein the PWM control unit provides a control signal to the FETs on the left bridge arm and right bridge arm;
   wherein the left arm comprises the first controlled DC voltage source connected in series to a drain of the first FET, and the right arm comprises the second controlled DC voltage source connected in series to a drain of the second FET, so as to form a dual power driving circuit including the switching device;
   wherein the first controlled DC voltage source and the second controlled DC voltage source satisfy the following relations:

$$\begin{cases} U_{dc1} = \frac{(1-D) \cdot B_f \Delta I \cdot R}{A} + R \cdot \bar{I} \\ U_{dc2} = \frac{(1-D) \cdot B_f \Delta I \cdot R}{A} - R \cdot \bar{I} \end{cases}$$

wherein,
   $U_{dc1}$ denotes the voltage of the controlled voltage source on the left bridge arm in the dual power driving circuit;
   $U_{dc2}$ denotes the voltage of the controlled voltage source on the right bridge arm in the dual power driving circuit;
   R denotes the winding resistance of the controlled electromagnetic unit;
   D denotes the duty cycle of the switching device in the dual power driving circuit;
   $\bar{I}$ denotes the average current required in a switching period of the dual power driving circuit;
   $\Delta I$ denotes the current fluctuation limit value in a switching period of the dual power driving circuit;
   $B_f$ denotes the margin coefficient tolerating average output current and current fluctuation of the system of the dual power driving circuit, $0<B_f\leq1$; and
   A denotes the current fluctuation coefficient of the controlled electromagnetic unit $$A = \left| \frac{e^{-\frac{R}{L}(1-D)T} + e^{-\frac{R}{L}DT} - e^{-\frac{R}{L}T} - 1}{1 - e^{-\frac{R}{L}T}} \right|$$

wherein,
L is the winding inductance of the controlled electromagnetic unit.

2. The electromagnetic drive control system of claim 1 further comprising:
a first parasitic diode connected between the drain and the source of the first FET;
a second parasitic diode connected between the drain and the source of the second FET;
a third parasitic diode connected between a drain and the source of the third FET; and
a fourth parasitic diode connected between a drain and the source of the fourth FET.

3. A control method for an electromagnetic drive control system comprising an H-shaped full bridge driving circuit connected to a controlled electromagnetic unit, the H-shaped full bridge driving circuit including a first FET and a fourth FET connected in series forming a left bridge arm, and a second FET and a third FET connected in series forming a right arm, and a PWM control unit to provide a control signal to the FETs on the left bridge arm and right bridge arm, wherein the left arm comprises a first DC voltage source connected in series to a drain of the first FET, and the right arm comprises a second DC voltage source connected in series to a drain of the second FET, so as to form a dual power driving circuit, the control method comprising:
adjusting at least one parameter of the electromagnetic drive control system to make the first DC voltage source and the second DC voltage source satisfy the following:

$$\begin{cases} U_{dc1} = \frac{(1-D) \cdot B_f \Delta I \cdot R}{A} + R \cdot \bar{I} \\ U_{dc2} = \frac{(1-D) \cdot B_f \Delta I \cdot R}{A} - R \cdot \bar{I} \end{cases}$$

wherein parameters of the electromagnetic drive control system comprise:
$U_{dc1}$ denoting the voltage of the controlled voltage source on the left bridge arm in the dual power driving circuit;
$U_{dc2}$ denoting the voltage of the controlled voltage source on the right bridge arm in the dual power driving circuit;
R denoting the winding resistance of the controlled electromagnetic unit;
D denoting the duty cycle of a switching device in the dual power driving circuit;
$\bar{I}$ denoting the average current required in a switching period of the dual power driving circuit;
ΔI denoting the current fluctuation limit value in a switching period of the dual power driving circuit;
$B_f$ denoting the margin coefficient tolerating average output current and current fluctuation of the system of the dual power driving circuit, $0<B_f \leq 1$; and
A denoting the current fluctuation coefficient of the controlled electromagnetic unit, $$A = \left| \frac{e^{-\frac{R}{L}(1-D)T} + e^{-\frac{R}{L}DT} - e^{-\frac{R}{L}T} - 1}{1 - e^{-\frac{R}{L}T}} \right|$$

wherein,
L is the winding inductance of the controlled electromagnetic unit.

4. A control method for an electromagnetic drive control system comprising an H-shaped full bridge driving circuit connected to a controlled electromagnetic unit, the H-shaped full bridge driving circuit including a first FET and a fourth FET connected in series forming a left bridge arm, and a second FET and a third FET connected in series forming a right arm, a first parasitic diode connected between the drain and the source of the first FET, a second parasitic diode connected between the drain and the source of the second FET, a third parasitic diode connected between the drain and the source of the third FET, a fourth parasitic diode connected between the drain and the source of the fourth FET, and a PWM control unit to provide a control signal to the FETs on the left bridge arm and right bridge arm, wherein the left arm comprises a first DC voltage source connected in series to a drain of the first FET, and the right arm comprises a second DC voltage source connected in series to a drain of the second FET, so as to form a dual power driving circuit, the control method comprising:
controlling the voltage of the controlled voltage source on the left bridge arm in the dual power driving circuit;
controlling the voltage of the controlled voltage source on the right bridge arm in the dual power driving circuit;
controlling the winding resistance of the controlled electromagnetic unit;
controlling the duty cycle of a switching device in the dual power driving circuit;
controlling the average current required in a switching period of the dual power driving circuit;
controlling the current fluctuation limit value in a switching period of the dual power driving circuit; and
controlling the margin coefficient tolerating average output current and current fluctuation of the system of the dual power driving circuit;
wherein the steps of controlling make the first DC voltage source and the second DC voltage source satisfy the following:

$$\begin{cases} U_{dc1} = \frac{(1-D) \cdot B_f \Delta I \cdot R}{A} + R \cdot \bar{I} \\ U_{dc2} = \frac{(1-D) \cdot B_f \Delta I \cdot R}{A} - R \cdot \bar{I} \end{cases}$$

wherein:
$U_{dc1}$ denotes the voltage of the controlled voltage source on the left bridge arm in the dual power driving circuit;
$U_{dc2}$ denotes the voltage of the controlled voltage source on the right bridge arm in the dual power driving circuit;
R denotes the winding resistance of the controlled electromagnetic unit;
D denotes the duty cycle of the switching device in the dual power driving circuit;
$\bar{I}$ denotes the average current required in a switching period of the dual power driving circuit;
ΔI denotes the current fluctuation limit value in a switching period of the dual power driving circuit;
$B_f$ denotes the margin coefficient tolerating average output current and current fluctuation of the system of the dual power driving circuit, $0<B_f<1$; and
A denotes the current fluctuation coefficient of the controlled electromagnetic unit, $$A = \left| \frac{e^{-\frac{R}{L}(1-D)T} + e^{-\frac{R}{L}DT} - e^{-\frac{R}{L}T} - 1}{1 - e^{-\frac{R}{L}T}} \right|$$

wherein,
L is the winding inductance of the controlled electromagnetic unit.

\* \* \* \* \*